(12) United States Patent
Poss et al.

(10) Patent No.: US 10,602,867 B2
(45) Date of Patent: Mar. 31, 2020

(54) ELECTRICALLY-POWERED PROGRAMMABLE STORAGE CONTAINERS

(75) Inventors: James A. Poss, Bainbridge Island, WA (US); Jeffrey Satwicz, Waltham, MA (US)

(73) Assignee: BIG BELLY SOLAR, INC., Newton, MA (US)

( * ) Notice: Subject to any disclaimer, the term of this patent is extended or adjusted under 35 U.S.C. 154(b) by 450 days.

(21) Appl. No.: 12/908,497

(22) Filed: Oct. 20, 2010

(65) Prior Publication Data

US 2011/0137484 A1 Jun. 9, 2011

Related U.S. Application Data

(63) Continuation of application No. 11/760,381, filed on Jun. 8, 2007, now abandoned, and a continuation-in-part of application No. 11/800,572, filed on May 7, 2007, now abandoned, which is a continuation-in-part of application No. 11/584,822, (Continued)

(51) Int. Cl.
| | |
|---|---|
| *A47G 29/22* | (2006.01) |
| *A47G 29/20* | (2006.01) |
| *A47G 29/14* | (2006.01) |
| *H02J 7/35* | (2006.01) |

(Continued)

(52) U.S. Cl.
CPC .......... *A47G 29/22* (2013.01); *A47G 29/141* (2013.01); *A47G 29/20* (2013.01); *A47G 29/30* (2013.01); *G08B 13/18* (2013.01); *H02J 7/355* (2013.01); *A47G 2029/145* (2013.01); *A47G 2029/148* (2013.01)

(58) Field of Classification Search
CPC ...... A47G 29/141; A47G 29/22; A47G 29/30; A47G 29/20; A47G 2029/145; A47G 2029/148; G08B 13/18; H02J 7/355
USPC ........... 320/101; 340/540, 541, 545.1, 545.2, 340/545.6, 568.1, 568.8
See application file for complete search history.

(56) References Cited

U.S. PATENT DOCUMENTS

| | | | |
|---|---|---|---|
| 4,147,100 A | 4/1979 | Dykstra | |
| 4,188,872 A | 2/1980 | Chrablow | |

(Continued)

FOREIGN PATENT DOCUMENTS

| | | |
|---|---|---|
| DE | 20318149 | 3/2004 |
| EP | 0899215 | 3/1999 |

(Continued)

OTHER PUBLICATIONS

English Abstract of JP2002-015610.*
International Search Report of PCT/US07/82115 dated Apr. 15, 2008.

*Primary Examiner* — Richard Isla
*Assistant Examiner* — Manuel Hernandez

(57) ABSTRACT

A package deposit enclosure designed for public use is powered by an efficient storage battery and photovoltaic cell array. These unique features allow the package deposit enclosure to be placed in locations where no power is available, but where there is frequent human traffic. Sensing and wireless data communication features allow the unit to be emptied less often than typical package delivery enclosures. Wireless communication also allows users' access to real-time information. On board power enables other functions, such as lighting and audio, to enhance device functionality.

20 Claims, 6 Drawing Sheets

Related U.S. Application Data filed on Oct. 23, 2006, now Pat. No. 7,481,159, which is a continuation-in-part of application No. 10/864,566, filed on Jun. 9, 2004, now Pat. No. 7,124,680.

(60) Provisional application No. 60/476,832, filed on Jun. 9, 2003.

(51) Int. Cl.
*A47G 29/30* (2006.01)
*G08B 13/18* (2006.01)

(56) References Cited

U.S. PATENT DOCUMENTS

| | | | |
|---|---|---|---|
| 4,827,645 A | 5/1989 | Stamps, Jr. | |
| 5,204,608 A * | 4/1993 | Koenck | H01M 2/1022 |
| | | | 307/150 |
| 5,222,853 A | 6/1993 | Carson | |
| 5,415,264 A | 5/1995 | Menoud | |
| 5,690,025 A | 11/1997 | Hawkins | |
| 5,713,270 A | 2/1998 | Fitzgerald et al. | |
| 5,747,965 A * | 5/1998 | LaPointe et al. | 320/112 |
| 5,818,336 A * | 10/1998 | Varga | A47G 29/1207 |
| | | | 340/545.1 |
| 5,829,349 A | 11/1998 | Fitzgerald et al. | |
| 5,967,355 A | 10/1999 | Ragot | |
| 6,000,323 A | 12/1999 | Schlegel | |
| 6,028,517 A * | 2/2000 | Sansone et al. | 340/569 |
| 6,081,104 A * | 6/2000 | Kern | H02J 9/065 |
| | | | 320/101 |
| 6,323,782 B1 * | 11/2001 | Stephens et al. | 340/10.31 |
| 6,367,377 B1 | 4/2002 | Gawley et al. | |
| 6,477,514 B1 * | 11/2002 | Gil et al. | 705/410 |
| 6,543,375 B1 | 4/2003 | Sargent et al. | |
| 6,626,093 B1 | 9/2003 | Van Der Touw et al. | |
| 6,715,669 B2 * | 4/2004 | Hara | 232/45 |
| 6,739,732 B2 | 5/2004 | Tseng | |
| 6,863,827 B2 | 3/2005 | Saraceno | |
| 6,882,269 B2 * | 4/2005 | Moreno | 340/5.73 |
| 6,967,575 B1 * | 11/2005 | Dohrmann et al. | 340/568.1 |
| 2001/0045449 A1 * | 11/2001 | Shannon | A47G 29/141 |
| | | | 232/19 |
| 2002/0035515 A1 * | 3/2002 | Moreno | A47G 29/141 |
| | | | 340/5.73 |
| 2002/0070703 A1 * | 6/2002 | Allen | H01M 10/465 |
| | | | 320/101 |
| 2003/0226884 A1 * | 12/2003 | Swider et al. | 232/26 |
| 2004/0232878 A1 * | 11/2004 | Couch | H02J 1/14 |
| | | | 320/101 |
| 2006/0220842 A1 * | 10/2006 | Breed | G06Q 10/06 |
| | | | 340/539.13 |
| 2007/0101875 A1 | 5/2007 | Poss et al. | |
| 2009/0161907 A1 | 6/2009 | Healey et al. | |

FOREIGN PATENT DOCUMENTS

| | | |
|---|---|---|
| EP | 1225137 | 7/2002 |
| EP | 1508535 | 2/2005 |
| JP | 2002015610 A | 1/2002 |
| WO | WO 2007/0101301 | 9/2007 |

\* cited by examiner

ELECTRICALLY-POWERED PROGRAMMABLE STORAGE CONTAINERS

CROSS REFERENCE TO RELATED APPLICATIONS

This is a Continuation of and claims priority to copending U.S. Utility application Ser. No. 11/760,381, filed Jun. 8, 2007, which is a Continuation-in-Part (CIP) of and claims priority to U.S. Utility application Ser. No. 11/800,572, filed May 7, 2007, now abandoned, which is a CIP of and claims priority to U.S. Utility application Ser. No. 11/584,822, filed on Oct. 23, 2006, now U.S. Pat. No. 7,481,159 issued Jan. 27, 2009, which is a CIP of and claims priority to U.S. Utility application Ser. No. 10/864,566, filed on Jun. 9, 2004, now U.S. Pat. No. 7,124,680 issued Oct. 24, 2006, which claims priority to Provisional Patent Application No. 60/476,832, filed on Jun. 9, 2003, all of which are incorporated herein by reference.

FIELD OF THE INVENTION

This invention is directed towards package delivery enclosures and more particularly to an apparatus and method for solar-powered delivery containers with embedded programmable logic controllers and sensors to determine package deposits, characteristics and contents.

BACKGROUND

Mail boxes and other package delivery containers are important items at any location where there are people mailing packages, to avoid the people having to carry packages with them to a centralized postal or shipping facility. Many cities and towns allow package drop boxes in many locations such as street corners and most users are accustomed to using such containers, provided that they are convenient and accessible. However, the containers require periodic emptying by postal or delivery service personnel, and this requires that personnel spend time and equipment traveling, emptying and hauling from the locations. Often, this travel occurs when there are few or no packages to collect. Additionally, package weight and size is not known until the package collector visits the drop box, at which time it is too late to plan for heavy of unwieldy loads. Finally, the public does not often know when packages are to be collected, and thus they are unable to make a decision about depositing their package in the container or traveling to a central facility for the fastest shipping of their package. Further, the public occasionally needs instructions on how to mail items properly. This is a cause for great inefficiency, unnecessary fuel consumption and monetary expenditures. In addition, dangerous situations whereby malicious users insert explosive or infectious substances can be avoided by this invention because solar-powered programmable logic controllers attached to sensors can alert personnel to the danger. Also, many of these containers contain shipping supplies, such as envelopes; address labels and the like, which are critical to convenient mailing. At times, these envelopes and other items are all used or stolen, so the public has no access to them. This makes mailing a package inconvenient or impossible. Finally, as some drop boxes require payment, the advent of solar-powered logic controllers, scanners and transmitters can enable payment options at the box, providing greater user convenience.

Package collection can be streamlined and improved with solar-powered "smart package delivery containers," which have programmable circuitry which enables the use of sensors, scanners, transmitters and receivers to foster efficient and easy package deposit, recognition and data transfer. With real-time knowledge of drop box "fullness," package destination, weight information, on-site envelope and label inventory and other package characteristics, programmable package delivery containers can save money by saving staff time, and can help to conserve fuel by reducing collection frequency, and thus vehicle travel time. The present invention can make mailing packages more convenient by helping staff ensure that envelopes, address labels and other necessary supplies are in stock, and it can provide real-time information to both staff and users, which makes the process more convenient and accessible. Prior art package enclosures either do not have electricity at all, or they require AC electricity, which limits them to locations conveniently attached to the electricity grid. This limits the location of such electricity-enabled drop boxes. Thus, prior art drop boxes are characteristically non-powered, or they are confined to areas where electrical connections are feasible and cost-effective.

There is a need for powered package holding enclosures in remote settings and high-traffic areas, that will allow people to conveniently mail packages, but that provide other information for emptying package enclosures safely and only when needed or optimal.

SUMMARY

The present invention uses the novel approach of using stored energy to gather and send data on package deliveries and collections. In one embodiment, the stored energy is solar energy. Solar energy is a clean source of power, and also it enables package recognition in remote locations where other forms of power are impractical and uneconomical. Often, it is impractical and uneconomical to connect grid power to a package delivery container located even at a relatively close distance to an electricity source, for example, across the street from a retail establishment. Also, in many cases, it is impractical to replace or recharge batteries.

This invention provides a low cost device and method for receiving and recognizing packages and package features and transmitting or receiving valuable information to and from route planners and schedulers using stored photovoltaic energy. The primary embodiment of the present invention is formed to efficiently and safely collect solar energy, efficiently store said energy and as needed, use the stored energy to run sensors and other electrical devices to collect and distribute data. The solar collector typically is a photovoltaic (PV) apparatus which is connected to a storage device, such as a battery, capacitor or fuel cell. Alternatively, since the device is constructed to be energy efficient, regular charging of batteries may be used in some situations to provide power for the device. Mechanical means of energy storage may include springs, pneumatic and hydraulic pressure, among others. The apparatus uses stored energy to intermittently detect packages, package characteristics and contacts. In another embodiment, the device supplies AC electricity to an AC-powered package delivery container by changing DC power from the PV array into AC electricity by means of an inverter.

In an illustrative embodiment, the electronics of the container are enclosed in a compartment adjacent to the package chamber. Neither compartment is accessible from the outside without a key, to prevent tampering and/or user injury.

The battery and electronics compartments are sealed from water to protect the enclosed electronics from the elements, and the battery compartment is vented separately from the electronics and motor compartments to allow for hydrogen gas to escape safely, as the flammable gas can be produced during charging of many types of batteries. The PV array is protected from weather and vandalism by a covering constructed typically of durable plastic or a metal grate. The battery is stored at the bottom of the compartment, while the hydrogen vent is located above the battery chamber to allow hydrogen gas to rise and escape the chamber without coming into contact with sparks from the circuits or electronics compartments or from static energy.

The package insertion door is monitored while a package is being mailed. A sensor in communication with the insertion door senses package delivery, use of the insertion door, and communicates this data to the processor, which counts packages being delivered, along with time of delivery and other information, which may include weight, destination, mailer and recipient name and address, etc. The information may be gathered through a barcode scanner. The insertion door is constructed to block users from reaching into the package compartment and removing packages. In the illustrative embodiment, this lockout is passive and does not require energy to operate. Similar contraptions are seen on mailboxes, and prevent the user from access to the inner chamber of the device. Another door which provides access to a compartment containing envelopes is also monitored by sensors, and data on its use is relayed to the processor. This compartment may also hold address labels, instructions, boxes, etc. Monitoring envelope inventories enables personnel to ensure adequate supply in each enclosure. Only package collection personnel can access the package chamber, the envelopes chamber and electronics chambers. An access door is hingedly attached to allow the package collection personnel to have unimpeded access to the enclosures.

In this embodiment, data relayed to the processor by the insertion door and enveloped door are gathered and intermittently relayed by a wireless transmitter to staff. By monitoring the usage of the container, a wireless communication mechanism can relay this information to the package collection personnel so that unneeded visits are avoided. Communication may be relayed with a wireless transmitter or by a physical indicator, such as an indicator lamp. Stored power is also used to count envelopes used or to otherwise help maintain adequate inventory, to provide lighting for users who need to read instructions or write address labels or the like at night, and to provide for voice recognition devices and voice operated instructions for the user. In this embodiment, the sensors monitoring the access doors engage the processor, which turns on other sensors, by activating relays, to engage in processes like counting envelopes or packages. This is done to reduce energy consumption from sensors being on continuously. In other embodiments, container use and package contents can be collected by other means, such as internal scales, photoeye sensors, limit switches, or other sensors, without changing the nature of the device. This data saves time and money by allowing the collection personnel to schedule collections according to demand.

Advantages of the present invention include a package deposit container which can be located in remote places that don't have access to AC power, which also require many fewer visits for emptying, while reducing wasted time and inconveniences associated with lack of stock of envelopes, labels and other supplies which must be kept in inventory for convenient package deposits.

Another advantage of the present invention is that information relayed to the container by staff can be displayed to users. Information such as when collectors are scheduled to arrive is important for convenient package mailing.

Another advantage of the present invention is that it is optimized to work more often during times of most usage. Peoples' use of the device will occur most often during daylight hours, and therefore the unit has power from daylight as needed to perform sensing. Further, since many users deliver packages at night, the device will provide lighting so users can easily see the instructions, the envelopes, the labels and so forth. In addition, since the processor is programmed to turn off sensors and other electronics when they are not used, to be more energy efficient, the energy storage will last a long time, reducing the need for expensive solar panels or time-consuming battery replacements. Another advantage is that it is programmed to track voltage and battery performance over a period of time, and has the ability to send a wireless message if the battery or sunlight are insufficient. Lighting can also be used to allow users to more easily identify the container. Another advantage of the present invention is that it can power voice recognition devices or can relay audible messages to the user, which assists the user in understanding instructions, particularly if the user is visually-impaired. Audible or visible package deposit confirmation provides customers with an important assurance that their package has been received. Another advantage of the present invention is that a voice module can be powered by the stored energy, activated by the user opening the insertion door or using other features, such as the envelopes door or an "on" button, and the volume of the speaker can be adjusted to meet the environment. For example, the volume would be set higher in noisy street corners, while it would be set lower in an office building. Finally, since the battery provides power at night, the transmitter/receiver can send or receive long messages at night when cellular communications are cheaper.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

The present invention is directed towards a package depost and collection enclosure with integrated battery storage and solar storage mechanism for public use. The generally rectangular metal unit has a solar panel on the top to attract maximum sunlight. The unit typically resembles package containers currently in use, with respect to aesthetics, usage and size.

Figure 1:
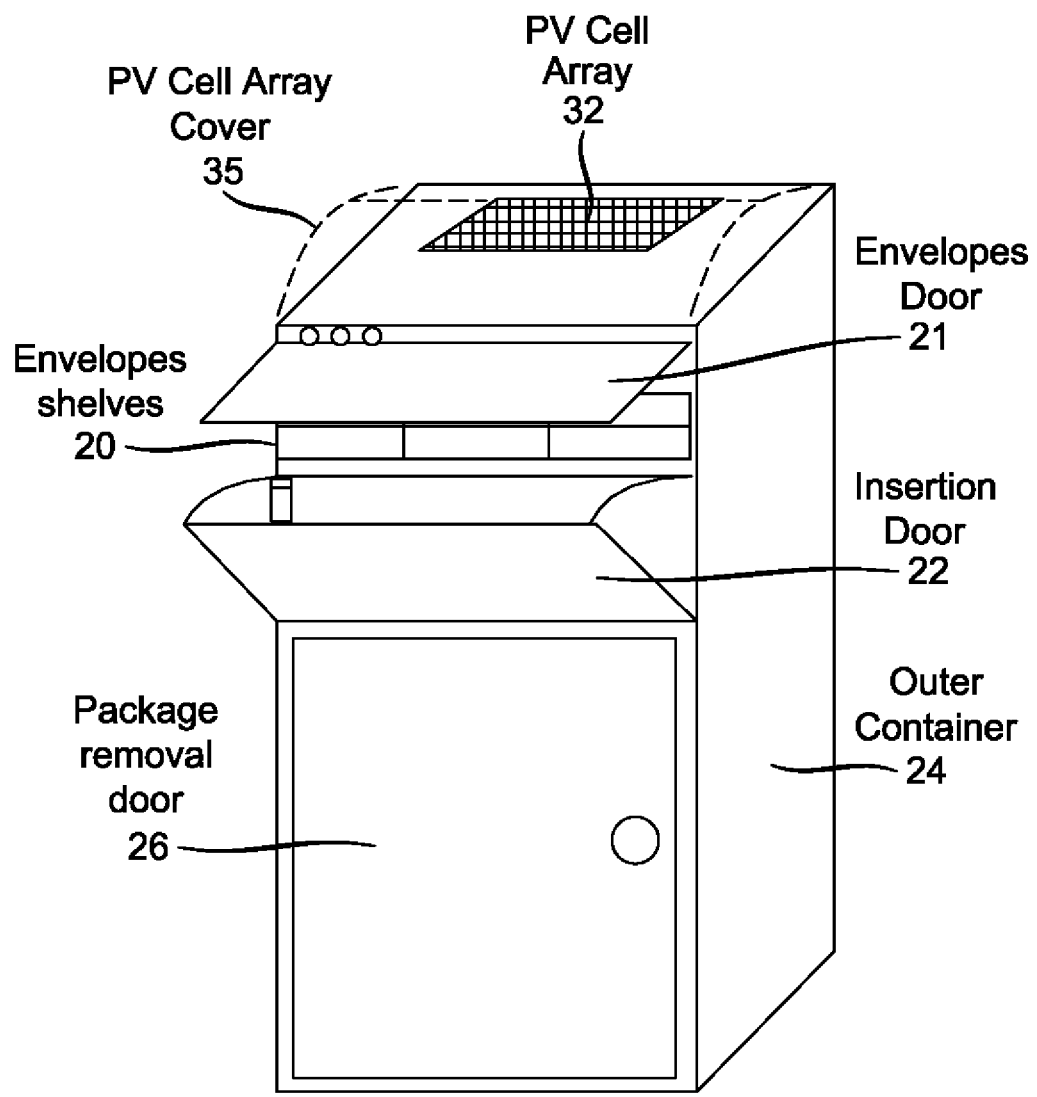
FIG. 1 illustrates a package deposit enclosure with insertion door, envelopes door, removal door and several internal components.
Figure 2:
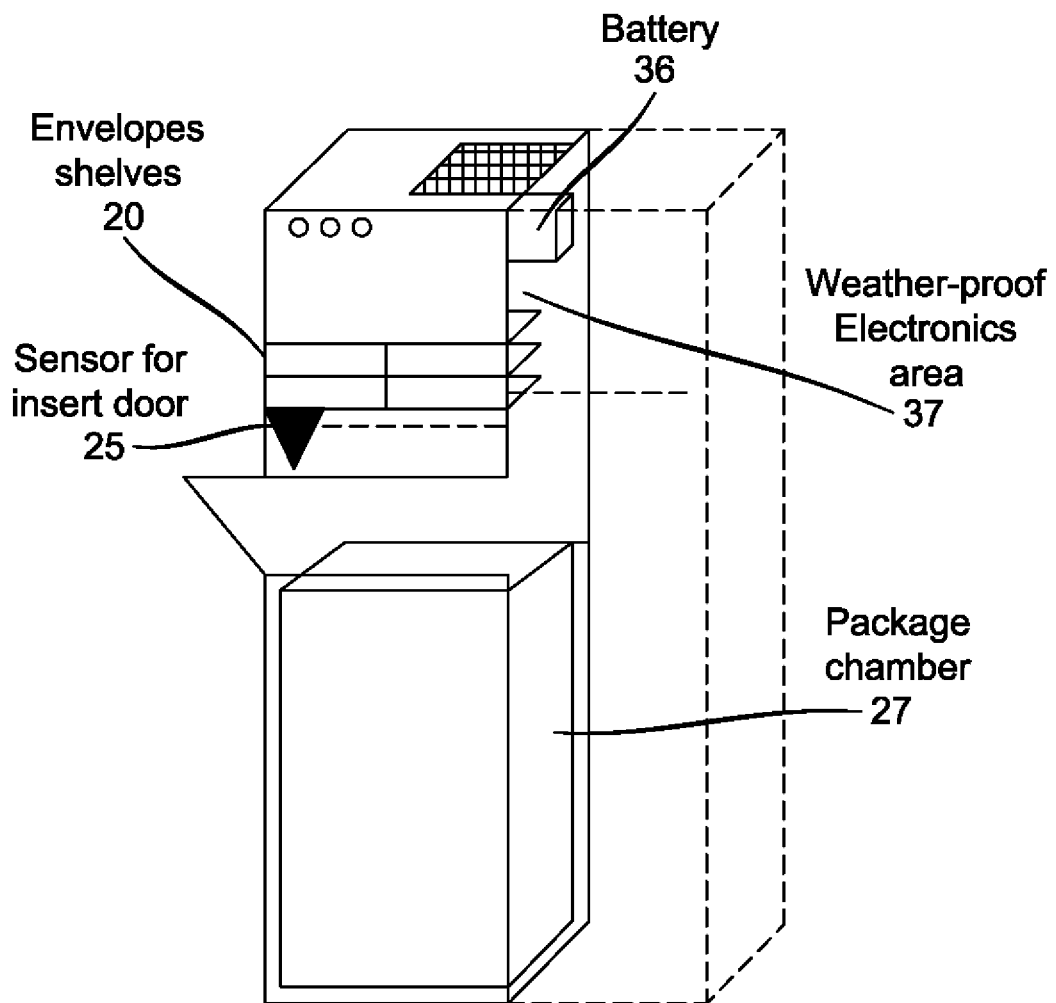
FIG. 2 shows a perspective sectional view of the present invention, package chamber, and several internal components.
Figure 3:
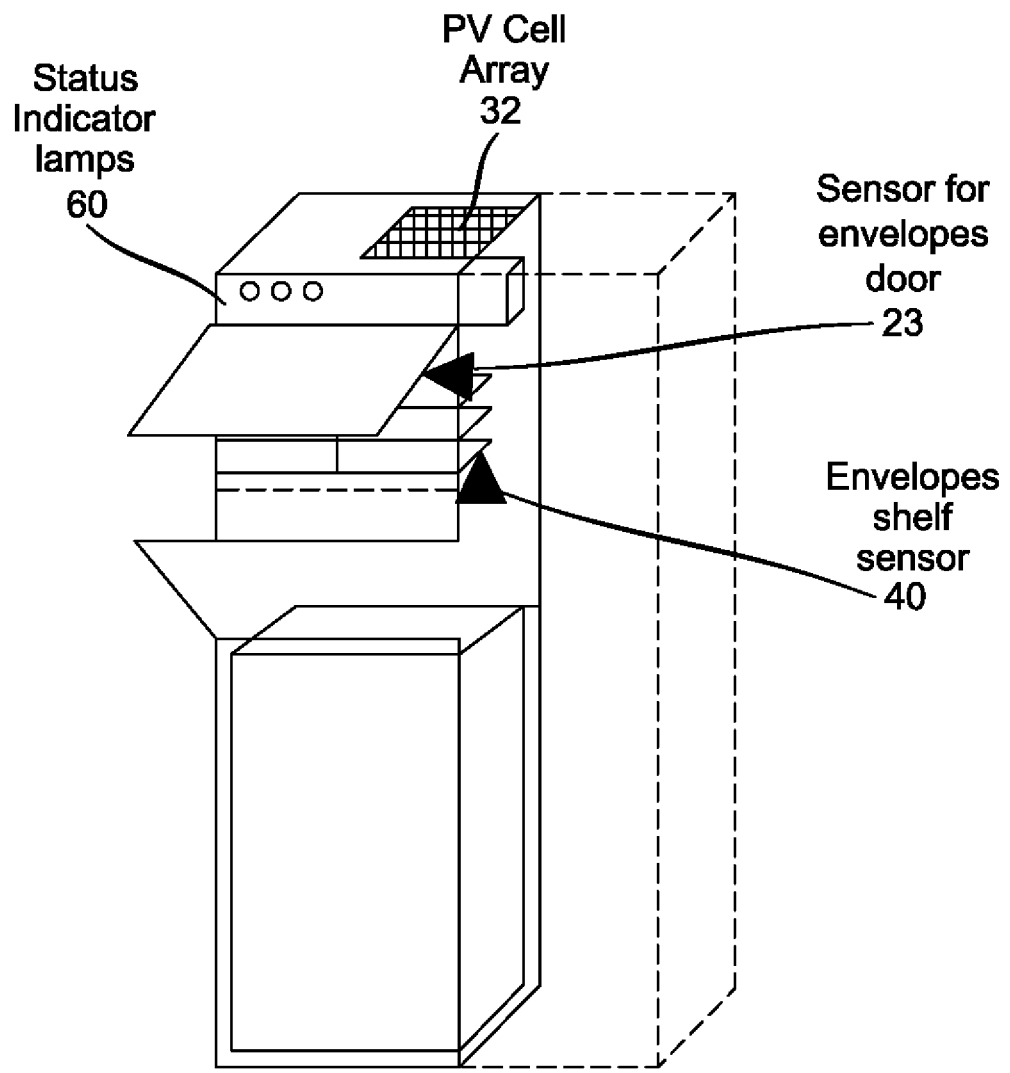
FIG. 3 is a perspective sectional view of several components.
Figure 4:
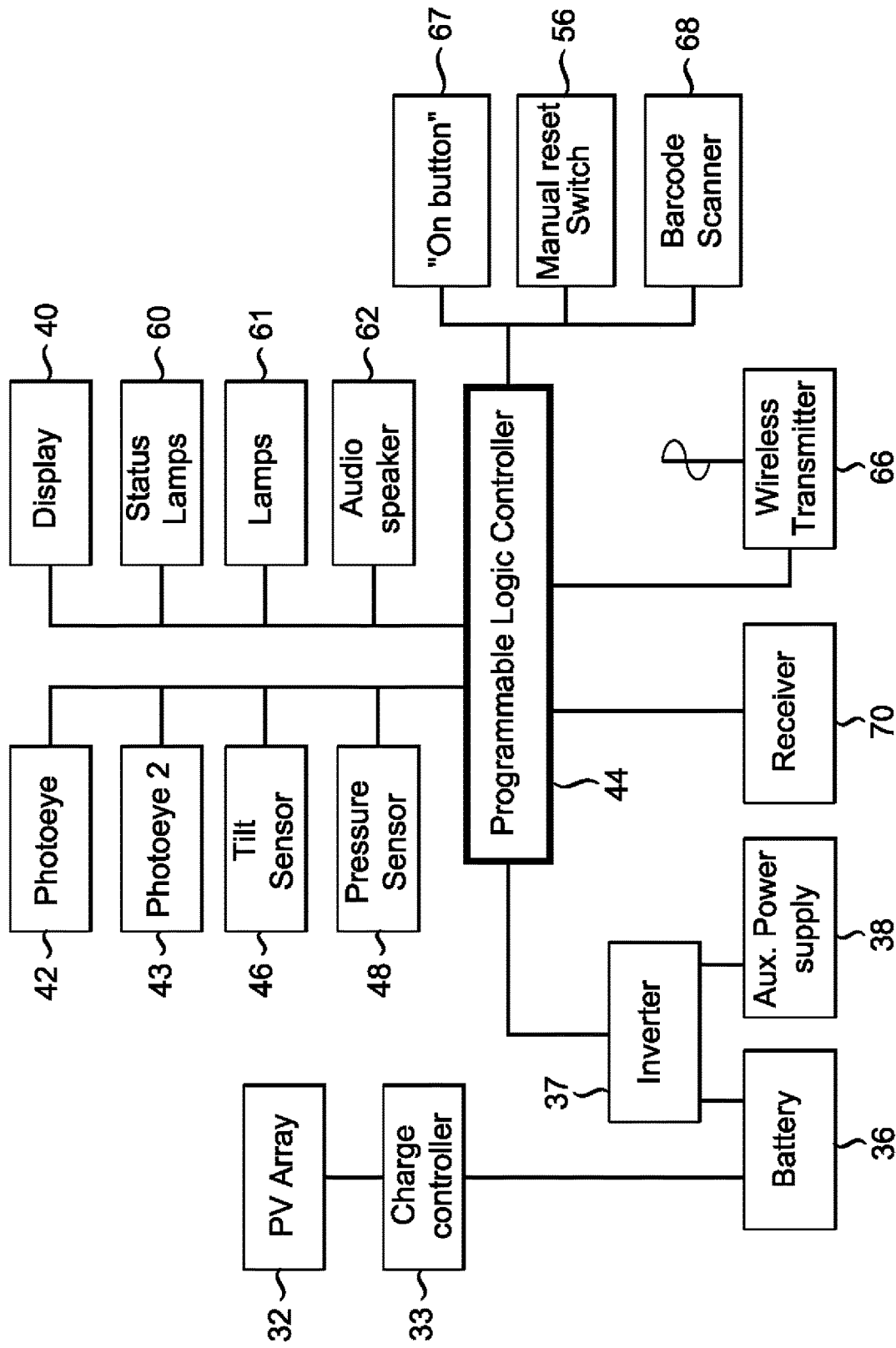
FIG. 4 is a schematic of one embodiment of an electrical system.

FIG. 1 provides a perspective view detailing outer container 24, insertion door 22, Envelopes and Mailers door 21, Envelopes and Mailers shelves 20, Package Removal Door 26, showing the relationship between the doors and compartments according to this embodiment of the present invention. A photovoltaic (PV) cell array 32 is mounted on top of the unit, covering part of it. In one embodiment, cells 32 produce enough power for the average number of 15 data logging events and wireless data transmissions per day. The battery 36, shown in FIG. 2, has enough energy storage to provide for usage through several weeks of intermittent sunlight, to provide adequate reserve power for periods of bad weather. The cells are wired to the energy storage system, which stores power to drive the sensors and Programmable Logic Controller PLC 44. Status indicator lamps 60, FIGS. 3 and 4, provide visual means of displaying information such as a system malfunction or to indicate the level of bin capacity used and available or other notices, such as "low battery," "bin collected," "envelopes empty," "device broken," or other messages. An insertion door 22 acts to prevent unauthorized use because it can lock out the user from the insertion door. In one embodiment, the insertion door lock is opened when it receives a message from PLC 44. In this embodiment, PLC will send a message to open the insertion door when it receives input from a Barcode Scanner 68, FIG. 4. This input may be given when, for example, a package with the appropriate Bar Code is placed in front of the scanner and the "ON Button," 67 in FIG. 4, is pressed by the user. In an alternative embodiment, the device is turned on when the Insertion Door 22 is opened or when the ON Button is pressed.

More details are provided with the illustrative embodiment shown in FIG. 3. The Photovoltaic (PV) array 32 is positioned on top of the device for maximum sunlight exposure. The PV array 32 may also be placed on other sides of the device to increase exposure to the sun when the sun is lower on the horizon or when the container is placed in a location with a roof overhead, or alternatively, the PV may reside outside of the container and be attached to the container of separate battery enclosure only by an electric cable. The PV array 32 may be optimally placed on an angle to prevent it from being covered by snow or debris. Further, the angle may be used to increase sunlight exposure based on azimuth of the sun across the sky. For example a PV array can be arranged to receive the most southern exposure during the day. Alternatively, the PV array 32 may be pivotally mounted and powered in order to rotate and track maximum sunlight exposure. Although the PV array 32 is shown attached to the unit, the PV array may also be separately located from the device and electrically connected. The PV array may alternatively be located inside the outer container 24, and the outer cover may be constructed to allow sunlight into the protected area where the PV resides. The PV array may otherwise be mounted in a location on or outside the outer container accessible by light via a reflective surface such as a mirror, and inaccessible by vandals, negligent operators and animals. The angle of the PV array 32 can be flat but could be positioned at any angle or could be able to be adjusted so that the installer of the enclosure can set the solar panel angle for optimal solar collection.

The PV array 32 is optimally placed between layers of foam, to absorb shock in the event that the machine is bumped or tipped. Additionally, there can be a curved plastic, such as a Lexan® panel or layers of Lexan® over PV array 32 to protect PV array 32 from vandals or negligent use. The PV array 32 can be covered by a curved PV Cell Array Cover 35, FIG. 1, that can be cost-effectively replaced. Additionally, the plastic panel layers will shed water and snow. In one embodiment, several layers of plastic coating, or other suitable material, may be applied during manufacturing such that one layer can be removed at a time, providing several layers of protection against vandalism, graffiti and scratches. For example, when one layer is used up, it is peeled away and a new, clean layer is present.

The storage battery or batteries 36 can be upsized or downsized for different climates, energy demands, or for or auxiliary functions, such as providing usable AC electricity through an inverter. The battery or batteries may also be stored separately from the container. The electronics compartments are preferably located in a weather-proof area 37 of the container. Electronic components can include a PLC, battery charging controller, user interface, audio speaker, and sensors, as will be described below. The access door to the electronics area 37 is key-lockable. When unlocked, the battery 36 will preferably be automatically disengaged.

In the illustrative embodiment, a deep cycle battery 36 is employed to drive photoeye or limit switch sensors for Envelopes Door 21, FIG. 1 and Envelopes Shelf Sensor 40, FIG. 3, which sense the presence or absence of the envelopes, mailers, labels and other important shipping and packaging material. Alternatively, the Envelope Shelf Sensors 40, FIG. 3, may sense the level of inventory in the Envelopes Shelves 20, FIG. 1. The battery 36, FIG. 2, may also be used to power Envelope Door Sensor 23 for the envelope compartments and Sensors for Insert Door 25 to monitor the insertion door in FIG. 2.

A control apparatus for the illustrative embodiment is shown in FIG. 4. The programmable logic controller 44 is a central microprocessor which manages all operations, detects all inputs and provides outputs for running the device. It controls power to the photoeyes 42 and 43, FIG. 4, by relays or contactors, (mechanical or solid-state) or other switching means. In different embodiments, photoeyes may be used in place of limit switches or vice versa, without changing the nature of the present invention. A tilt-sensor 46 is located above the package chamber 27, FIG. 2, and is actuated when the device is vandalized or tipped by a car or accident. Photoeyes 42 and 43, FIG. 4, are turned on when PLC 44 senses that the Insert Door or Envelope Door has been opened, or alternatively when the On Button has been pressed, to save energy used sensing objects unnecessarily. When turned on, the photoeyes or limit switch sensors will determine whether envelopes block the light rays between this photo-eye sensor and a reflector on the opposite side of the channel above the envelope chamber or when the limit switches are pressed. The photo-eyes signal the programmable logic controller (PLC) 44 when envelopes block the light beam for a measured amount of time, indicating that envelopes are present. When envelopes are not present, a message will be sent by the wireless transmitter/receiver 66 connected to the PLC 44 as shown schematically in FIG. 4. Other sensors may be used to detect the number of uses of the insertion door 22 in FIG. 1 or the Envelope door 21 in FIG. 1. In an alternative embodiment, a mirror system may be implemented instead of a photo-eye transmitter and receiver to reduce wiring and wire installation labor costs.

Pressure sensors 48, FIG. 4, may be used instead of photoeye sensors, and alternatively are used to sense envelope presence, absence or inventory levels. Tilt Sensor 46, can transmit a message to PLC 44 in FIG. 4 if the device has been vandalized, stolen or tipped over. A display 40 in FIG. 4 may be used to display messages to users. These messages may be transmitted to the PLC 44 from the wireless transmitter/receiver or may be programmed into the PLC manually by service personnel. Also in FIG. 4, in addition to a display, Status Lamps 60, FIGS. 3 and 4, may be used to convey messages including but not limited to "on," "low battery," "collected," and "broken." Lamps 61 may be turned on by the PLC 44 when ambient light is low, or when users are in need of light to aid in seeing forms to fill out or in reading instructions. Also, an Audio Speaker 62 in FIG. 4 may be used to convey messages. The PLC 44 will enable Audio levels to be controlled and programmed.

PV Array 32 in FIG. 4 is connected to a charge controller, which controls charging to the battery 36. An inverter 37 is connected to the battery to provide auxiliary power through a supply port 38 or power to AC devices, as diagrammed schematically in FIG. 4. Finally, there is a manual reset switch 56 connected to the PLC 44 in FIG. 4.

In this embodiment, the projected PV array output is 10 Watts Peak, and will generate up to 30 Watt-hours of energy per day, given an average of 3 hours of full sunlight available per day. Sunlight energy is collected in the PV Array 32, FIG. 4, and is converted by the charge controller 33, into a useful battery charging current and voltage. Battery reserve will be approximately 100 Watt-hours, and each data transmission will use approximately $\frac{1}{10}^{th}$ Watt-hours. Thus, the energy reserve in the illustrative embodiment is enough to run up to 1,000 message transmission cycles. In many situations, it may be preferable and cost-effective not to use a PV Array, but rather to charge batteries off-site and swap these charged batteries into the device as needed. In this case, the battery may be slightly larger than described above. The controller will be programmed to permit data transmission cycles and lighting such that battery over-discharge and thus battery damage is avoided. The controller will also be programmed to sense a battery losing capacity and to send a final data transmission before the battery loses power, warning personnel that battery and therefore the system is close to malfunction.

A feature of another illustrative embodiment is that the PLC 44, when in charging mode, can act as a maximum power tracker, regulating the charging of the battery from the PV array. The power tracker has the ability to vary the level of voltage and amperage based on the characteristics of the PV array, the sunlight level and the battery condition. The power tracker has the ability to balance off current and voltage to optimize battery 36 charging. The PLC 44 has the ability to optimize the charging regimen of the batteries 36, by tracking the level of photovoltaic energy available and the battery charge. When the battery 36 is fully discharged, the controller 44 will provide low voltage and high amperage. When the battery 36 is almost completely charged, the controller 44 will provide a higher voltage and lower current. When the battery is fully charged, the controller will not provide any charge to the battery 36, or will simply provide a trickle charge. Conversely, when the battery 36 is undercharged, the controller 44 may delay or skip a data transmission or may limit lighting or audio until adequate charge has been attained or until a new battery has been installed. This serves to save battery life and prevent failure.

Because of the ability for the controller 44 to optimize charging regimen and control the data transmitter and lights, it serves a dual purpose.

This duty cycle is typically determined by low power timing circuitry contained in the receptacle. It is modifiable on the unit, or is programmable by means of a wireless communication device or by electrical connection between the programming device (i.e. computer) and the PLC 44. The controller 44 can also include data logging features, to allow usage history to be stored for later analysis or transmitted in bulk.

Table 1 provides specifications for a system in accordance with one embodiment of the present invention.

TABLE 1

| Physical Specs of Unit | Size of Compartment |
|---|---|
| Height of outer container | 48.00 inches |
| Height of Insertion door | 10 inches |
| Width of solar array | 10.00 inches |
| Length of solar array | 10.00 inches |

Certain embodiments may include additional controlling components. For example, a controlling component programmed to reduce or increase the clock speed (processor speed) to save energy may be implemented into PLC 44. Logic of the controlling component slows the clock speed when no cycles are being run. During a period of high use, the clock speed of the PLC 44 runs fast so that data transmission or sensor monitoring can happen quickly and accurately. Failure to slow clock speed of the PLC results in wasted energy, and failure to speed clock speed can result in packages being missed or mis-counted, or data transmission time can be lengthened, increasing air-time costs. A microcontroller, such as a PIC processor, may be is used in PLC 44. During data transmission and sensor activation, the processor operates at approximately 4 Mhz. Otherwise it operates at approximately 32 Khz.

Additionally, a controlling component programmed to turn on sensors such as pressure sensor 48 only as long as they need to be in order to properly respond to the sensor signal may be implemented in PLC 44. Certain photo-eye sensors, such as photo-eye sensor 46, must be turned on for a minimum period, for example 0.3 seconds, to reliably respond to the input signal. This saves energy because the sensors consume energy only when they are on. Logs may be stored in hard drive memory and sent by the wireless transmitter to staff. These logs may be uploaded wirelessly to a central server so status information to users via cell phone or email or SMS (text message) can be relayed.

Another feature may include a controlling component and door sensor programmed to engage photo-eye sensor 43 only when packages are deposited, rather than at regular intervals, to save energy. The controlling component is therefore programmed to trigger photo-eye sensor 43 after insertion door 22 has been opened or after Envelope Door 21 is opened. In this embodiment, there is a transducer such as an inductive sensor or Hall Effect sensor, located on Insertion Door 22 or Envelope Door 21, to allow for a signal to be sent to the controlling component indicating each usage.

In one embodiment, the controlling component is programmed to shut down unused circuits within PLC 44. Specifically, the controlling component is programmed to turn off the current sensor and relays when the bin is in monitoring mode and turned on when in compacting mode to save energy. Certain areas of the controlling component may be activated or deactivated according to different methods. In certain embodiments the activation of discrete controlling components is implemented through either a MOSFET component, a relay or through different pins on the processor directly for areas of the circuit requiring lower current. By constantly monitoring and turning off circuits of the controller when those circuits are not required for operation, energy may be conserved.

Another embodiment includes a controlling component that is programmed to regulate the battery charger to eliminate battery charger energy consumption when solar power is not sufficient enough to charge the battery. The controlling component is programmed to actively monitor wattage from the solar panel and to turn off the controller when the wattage drops below a threshold voltage. The battery charger is only turned on when adequate voltage on the panel is reached, and off when it is not. Since many battery chargers require some activation energy from the battery to begin the charging process, the controlling component is programmed to supply the activation energy only when solar energy is available. Alternatively, a blocking diode may be used to keep current from flowing from the battery to the battery charger. Thus, no energy is able to pass from the battery 36 to the battery charger; it is only able to come from the PV array 32 when it has sufficient voltage to charge the battery.

The battery charger typically requires activation energy to charge the battery. Without this activation energy, it blocks any current from going through the charger to the battery. By placing a resistor between the positive lead of PV array 32 and positive lead of charger, the PV array 32 can provide that activation energy when there is sun on the PV array 32. Once operating, the charger is the lower resistance path, so energy flows through the charger to the battery.

In one embodiment a information panel may be incorporated. The information panel may be a lighted sign, a scrolling panel, or other method that may be used to display information or advertising. These information panels may be intermittent-use devices. The intermittent powering may help control the energy budget because the panel can charge between cycles, similarly to the data transmitter mechanism. In another embodiment, the intermittent-use feature may be used in controlling the lighting of the device. Cycling the lighting at very rapid duty cycles that are invisible to the human eye, energy can be conserved. In an alternative embodiment, the lighting may be pulse modulated at slower cycles, thereby conserving energy. In yet another embodiment, the signage may be controllable via wireless receiver from a base location. For example, the base station may want to post an electronic message such as an advertisement or emergency message on each receptacle, or a message that, for example, the packages will next be collected at 2 PM on Tuesday.

Another illustrative embodiment includes a controlling component that is able to disengage energy draws when voltage is low. For example, in many settings, the machine may be able to power lighted signs as discussed above. The controlling component may programmed to disengage these signs from the electricity source (i.e. battery 36) when the voltage is low as a means of conserving energy for a data transmission or other prioritized function.

A controlling component that is able to disengage electricity to the motors of a scrolling advertisement sign when there is not sufficient voltage to power the signs' motors may be incorporated. The controlling component may do this by powering a relay to connect electricity to the sign's motors only when there is sufficient voltage to power the sign. Additionally, the controlling component can be programmed to power the sign's motors only when advertising is beneficial, at lunch hour in a busy outdoor area, for example.

Another embodiment includes a controlling component that is programmed to search for the best source of energy. In a device that has the ability to be plugged in, for example, the controlling component would default to solar power source unless the machine is plugged in. When plugged in, the unit's energy-storing capability absorbs large fluctuations in energy use, which lowers the peak current that the machine draws. This is advantageous because utility-supplied electricity charges are based on both total draw and peak draw. This feature would reduce peaks, resulting in lower electricity costs. For a unit that is charged by a utility-supplied electrical source, the controller can have a real time clock installed to only charge the battery during "off peak" times, typically during the nighttime, when electricity rates are lower than in daytime. This may be accomplished with a controlling component that is programmed to engage and disengage relays to connect the best power source to the charging circuit. Alternatively, the relays may be wired to provide activation energy to the relay with the highest energy.

This present embodiment may be implemented in situations where units are placed temporarily and then placed on a charger periodically. In other situations where the unit is searching for the best source of energy, it may be programmed to use sunlight whenever there is sufficient charging current and to use utility electricity when sunlight is not adequate to charge the battery. Thus, it does not have to interpolate over time. An efficient charging interpolator would use sunlight during the day, and utility power at night, if both are available all the time. Alternatively, when the battery is charged off-site and replaced periodically, the PLC 44 will be able to determine the optimal replacement frequency of the battery and may be able to display that information on the display panel 40 or transmit the information wirelessly via transmitter/receiver 66 in FIG. 4.

A controlling component and electronics that enables recharging of the energy storage system by another source such as the collection truck may be implemented in an additional embodiment. This is particularly useful when machines are in storage.

In another embodiment, multiple containers according to the embodiments described herein can be placed adjacent to one another. This could either be in a very busy location that requires more than one container.

Another embodiment may include a controlling component that is programmed to track voltage over a period of time, and if voltage is falling, the controlling component turns on an indicator telling users that the machine is placed in an unsatisfactory location or orientation and must be moved, or that the battery is failing and must be replaced. This is advantageous because there are natural peaks and valleys in voltage that must be "averaged out" in order to determine if a location is bad. By monitoring voltage over 2 weeks, cloudy weather lows and sunny weather highs can be incorporated into a calculation that indicates placement optimization. Natural highs and lows can be averaged out over a 2 week period because inclement weather patterns rarely occur for more than 2 weeks. Also, 2 weeks of energy storage is sufficient but is not overkill. So a 2 week period is an optimal time period to determine placement optimization while monitoring over a longer period would be optimal to determine whether a battery is losing its ability to retain adequate charge.

In yet another embodiment, the controlling component can be programmed to allow for a variety of settings to be controlled by the staff personnel. In this embodiment, the controlling component receives a signal from a potentiometer which can be used to adjust the desired lighting levels, voice volume, microphone sensitivity or other setting that may be optimally adjusted from time to time, or location to location.

An additional embodiment includes means to generate energy from the insertion door movement. In one embodiment, each time the door is opened, there is a piezoelectric element that generates current when the door is opened. Alternatively, the insertion door movement may actuate a rotating flywheel, which then turns a generator, thereby producing current.

Another embodiment incorporates a controlling component that is programmed to engage a relay to turn on a wireless transmitter when it needs to transmit a "full" or "malfunction" signal. The controlling component is programmed to disconnect the transmitter or receiver from the electrical system to save energy, and the electrical system is attached to the transmitter via relays so this disconnect is physically possible.

Another embodiment includes bomb-sensing logic in a controlling component. The controlling component is programmed to engage a relay to turn on an explosives detector when the machine is used. The controlling component is programmed to disconnect the detector from the electrical system to save energy, and the electrical system is attached to the detector via relays so this disconnect is physically possible. The device may be outfitted with a camera that is activated by the opening of the insertion door. The device may store a photo of everyone who deposits packages or into the machine, or of a malicious vandal who kicks the unit or places lit paper in the device, for example in memory such as a flash memory device. If no malicious behavior is noticed, or there is no need to store data in the device, the memory is dumped. Otherwise the photos may be wirelessly transmitted to assist authorities in catching the person who engaged in the malicious act.

Another embodiment includes other devices such as security monitoring cameras or emergency calling transmitters may be similarly controlled by the controlling component and detached from the electricity supply to save energy when they are not in use.

In yet another embodiment, an accelerometer may be implemented. The accelerometer watches for high forces in the device, indicating the possibility of theft or vandalism. Upon detection of an unauthorized event, a signal may be sent to the device's owners so that they can respond in a timely manner to repair the machine and ensure that it is not in a state that would be dangerous to people. In an alternative embodiment, a tracking system, such as a global positioning system ("GPS") or other suitable tracking device may be implemented. These devices may be switched on and off by the PLC, to enable the device when it is being used, and to disable the device when it is not being used, to reduce energy consumption.

Additionally, in another embodiment a controlling component is programmed to engage a solenoid or other actuator which locks the insertion door when the package chamber is full. This prevents overflow from the bin.

In an additional embodiment, the device may include certain fitments that allow for the automated removal of the removable bin. The fitment may include a bar or a handle at certain height, or reinforcing ribs so that a mechanical hand can safely grab the removable bin without breaking it or causing to flex inward to such a degree that the packages inside are damaged or that they cannot be removed.

Another embodiment of the present invention provides for an animal-resistant device. This embodiment incorporates a latch that animals cannot operate, but that humans and handicapped humans can operate. The latch prevents animals from entering the package or envelope chambers. In the event that an animal gains access to the compartments, all wiring may be protected by metal or hard plastic to protect it from any damage that an animal may cause.

The container may include a heating element which may be controlled so that it is only activated when the battery 36 is near full charge. Further, heating elements may be placed above, beneath or within the PV array, in order to melt snow or ice that is covering the PV array. Sensors can detect moisture, temperature, or a lack of light reaching the PV array and activate the snow melting heating elements, or may initiate fans to evaporate liquids inside.

The container may include mounting clips on the exterior to allow advertisement placards to be placed on the outside of the containers. Other features include wired or wireless communications equipment installed with the container. Radio or other wireless signals may be transmitted by the container when it is full and no more deposits are possible, or if the unit is broken or being vandalized. Further, the container can report on conditions including battery charge, cycle counts etc. The container can also receive signals, including commands to immediately perform tasks such as changing the display or audio message. The containers may also report conditions by indicator lights which may indicate if the unit is full or malfunctioning. Such indicator lights allow the containers to be inspected from a distance (such as through binoculars) to allow service personnel to determine whether it is necessary to make a service trip to the container.

Although solar power is disclosed as a source of power for the present invention, other sources of power are within the scope of the invention. This includes windmill or waterwheel generators located proximate the container, or located at an optimal location for collecting power. Alternatively, a generator with a hand or foot crank may be positioned with the container, with instructions inviting users of the container to crank the handle or pedal several times to help store energy. For such generators, whether by windmill, waterwheel or human, alternative energy generation means and energy storage means may be used, for example pumping air into a pressure tank for driving a pneumatic motor, winding up a spring mechanism, or a pulley system, the present invention is geared to be energy efficient, and to run off stored energy.

Figure 5:
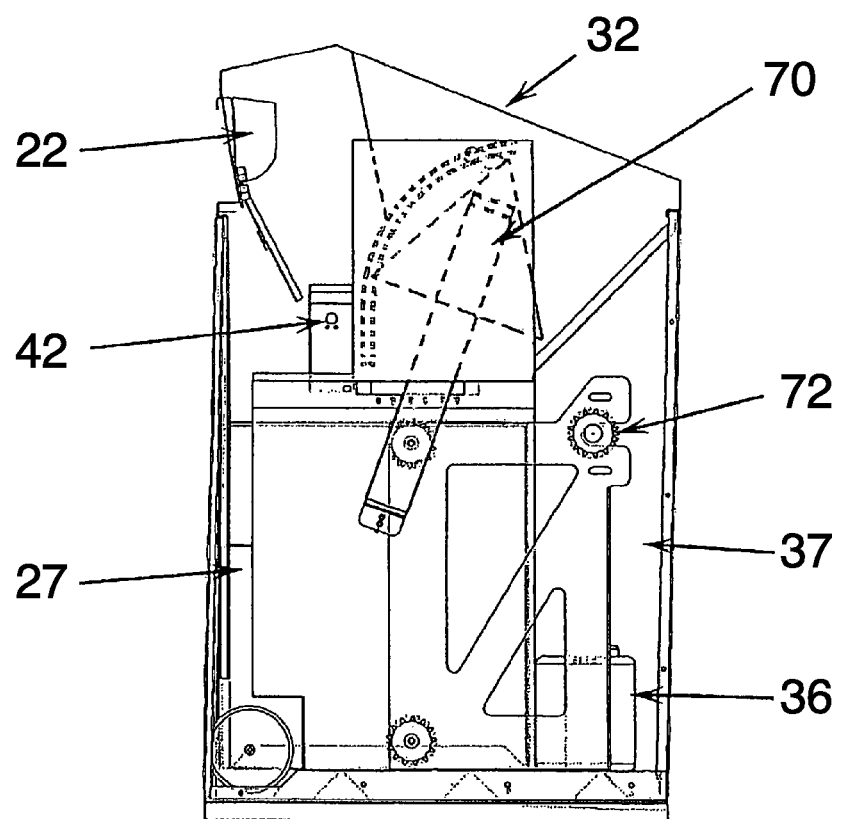
FIG. 5 illustrates an example system showing some internal components.

The compaction ram 70 is shown in the resting position above the compaction chambers 78, FIG. 5. The illustrated embodiment includes a two sided ram to improve compaction capability and to facilitate removal by decreasing weight of each load, FIG. 6. The chain drive sprocket 72, upon rotating, drives chain 74 forward, driving the attached compaction ram 70 down, compacting the load. Alternatively, the compaction ram 70 may move up or sideways, depending on the design of the system. The removable bin 78 includes a handle and wheels to roll smoothly in and out of the outer container 24. In one embodiment, the trash could be deflected toward the rear of the trash compartment, under compaction ram 70 to allow for more complete compaction. This would allow a longer time period between compactions, reducing the amount of energy used by the device.

The storage battery 36 is located preferably at a low point in the container to provide stability. The storage battery or batteries 36 can be upsized or downsized for different climates, compaction demands, or for or auxiliary functions, such as providing usable AC electricity through an inverter. The battery or batteries may also be stored separately from the container. The electronics compartments are preferably located in a weather-proof area 37 of the container. Electronic components can include a motor controller, battery charging controller, user interface, and sensors, as will be described below. The access door 26 to the electronics area 37 is key-lockable. When unlocked, the battery 36 will preferably be automatically disengaged.

Figure 6:
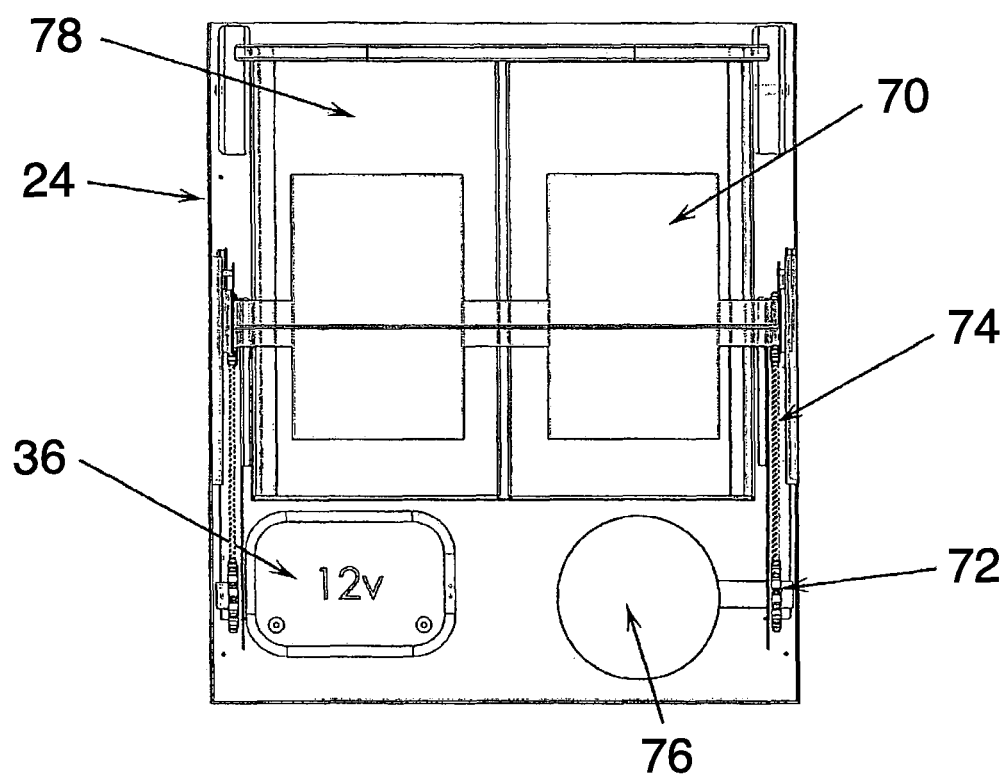
FIG. 6 illustrates another view of an example system showing various components.

In the illustrative embodiment, a deep cycle battery 36 is employed to drive a DC motor 76, FIG. 6. The motor 76 drives a chain 74, which rotates sprockets rigidly connected to the unit 72, and which transmits the crushing force to the compaction ram 70. Alternatively, the motor 76 may provide power to the chain drive 72 through a drive shaft and gears, including reduction gears, or one or more motors 70 may be directly attached to the chain drive 72, or the motor or motors may be connected via reduction gears to chains or lead screws, which control the position of the compaction ram. Alternatively, a hydraulic piston may be used to move the compaction ram. In this embodiment, the motor is used to drive a fluid pump, which supplies pressure to the hydraulic cylinders to move the ram. Optimally, the chain drive system can be made to use as few sprockets and gears as possible to reduce friction in the system. One embodiment of the present invention uses two sprockets on each side with a vertical chain drive 72 to reduce frictional losses. The vertical chain drive 72 reduces operational resistance, increasing efficiency.

Although the invention has been shown and described with respect to illustrative embodiments thereof, various other changes, omissions and additions in the form and detail thereof may be made therein without departing from the spirit and scope of the invention.

The invention claimed is:

1. A method comprising:
    collecting solar energy via a photovoltaic panel connected to a storage container, wherein the photovoltaic panel is positioned to be exposed to sunlight and convert sunlight into electric power;
    storing the electric power at a battery disposed within the storage container;
    detecting, using an insertion door sensor, a position of an insertion door of the storage container to yield a detected position of the insertion door;
    triggering a package sensor based on the detected position of the insertion door, the package sensor configured to detect a presence of a package of a plurality of packages stored in the storage container when the insertion door is in an open position;
    triggering an inventory sensor when an access door sensor associated with an access door to a supply compartment detects that the access door is in an open position, wherein the inventory sensor is configured to detect a presence of packaging materials contained within the supply compartment; and
    monitoring, via a controlling component, usage information of the storage container, the usage information comprising a respective weight of the plurality of packages deposited within the storage container.

2. The method of claim 1, further comprising displaying a signal indicating a next collection of contents in the storage container.

3. The method of claim 1, wherein the controlling component is configured to disengage a transmitter to reduce energy use.

4. The method of claim 1, wherein the controlling component is configured to disable unused circuits connected to the battery.

5. The method of claim 1, wherein the controlling component is configured to regulate a battery charger, and wherein the controlling component is configured to disable the battery charger when solar power is insufficient to charge the battery.

6. The method of claim 1, wherein electronic components in the storage container are sealed from water to protect the electronic components, wherein the electronic components comprise at least one of the battery, the controlling component, and the package sensor.

7. The method of claim 1, wherein the controlling component is configured to turn off unused electronic components, wherein the unused electronic components comprise at least one of the package sensor, a display, a transmitter, and a receiver.

8. The method of claim 1, wherein the controlling component is configured to track voltage and battery performance over a period of time, and wherein the controlling component is configured to generate a signal when at least one of battery power and solar power is insufficient.

9. The method of claim 1, wherein the controlling component is configured to skip operations when the battery is undercharged until the battery has attained an adequate charge.

10. The method of claim 1, wherein the package sensor is powered from the solar energy converted into electric power.

11. A storage container comprising:
    a processor;
    a control component; and
    a computer-readable storage medium having stored therein instructions which, when executed by the processor, cause the processor and the control component to perform operations comprising:
        collecting solar energy via a photovoltaic panel, wherein the photovoltaic panel is positioned to be exposed to sunlight and convert sunlight into electric power;
        storing the electric power at a battery;
        detecting, using an insertion door sensor, a position of an insertion door of the storage container to yield a detected position of the insertion door;
        triggering a package sensor based on the detected position of the insertion door, the package sensor configured to detect a presence of a package of a plurality of packages stored in the storage container when the insertion door is in an open position;
        triggering an inventory sensor when an access door sensor associated with an access door to a supply compartment detects that the access door is in an open position, wherein the inventory sensor is configured to detect a presence of packaging materials contained within the supply compartment; and
        monitoring, via the controlling component, usage information of the storage container, the usage information comprising a respective weight of the plurality of packages deposited within the storage container.

12. The storage container of claim 11, wherein the computer-readable storage medium stores additional instructions which, when executed by the processor, cause the processor to perform further operations comprising skipping an operation when the battery is undercharged until the battery has attained an adequate charge.

13. The storage container of claim 11, wherein the computer-readable storage medium stores additional instructions which, when executed by the processor, cause the processor to perform further operations comprising displaying a signal indicating a next collection of contents in the storage container.

14. The storage container of claim 11, wherein the computer-readable storage medium stores additional instructions which, when executed by the processor, cause the processor to perform further operations comprising disengaging a transmitter to reduce energy use.

15. The storage container of claim 11, wherein the computer-readable storage medium stores additional instructions which, when executed by the processor, cause the processor to perform further operations comprising disabling unused circuits connected to the battery.

16. The storage container of claim 11, wherein the computer-readable storage medium stores additional instructions which, when executed by the processor, cause the processor to perform further operations comprising regulating a battery charger, and disabling the battery charger when solar power is insufficient to charge the battery.

17. The storage container of claim 11, wherein electronic components in the storage container are sealed from water to protect the electronic components, wherein the electronic components comprise at least one of the battery, the controlling component, and the package sensor.

18. The storage container of claim 11, wherein a transmitter and the package sensor are powered from the solar energy that is converted into electric power.

19. The storage container of claim 11, wherein the controlling component is configured to track voltage and battery performance over a period of time, and wherein the controlling component is configured to generate a signal if at least one of battery power and solar power is insufficient.

20. A storage container comprising:
    an enclosure comprising a storage compartment for receiving a plurality of packages;
    a battery housed within the enclosure, the battery powered by a solar photovoltaic array disposed on the enclosure;
    an insertion door providing access to the storage compartment;
    an insertion door sensor configured to detect an open position of the insertion door;
    a supply compartment for storing packaging materials, the supply compartment comprising an access door, an access door sensor, and an inventory sensor, wherein the access door sensor is configured to detect an open position of the access door, and wherein the inventory sensor is configured to detect a presence of packaging materials contained within the supply compartment;
    a package sensor disposed proximal to the insertion door, the package sensor configured to detect each package of the plurality of packages; and
    a controller electrically connected to the battery, the insertion door sensor and the package sensor, wherein the controller is configured to trigger the package sensor when the insertion door sensor detects the insertion door is in the open position, and wherein the controller is further configured to trigger the inventory sensor when the access door sensor detects the access door is in the open position.

* * * * *